US006792817B2

(12) United States Patent
Viola et al.

(10) Patent No.: US 6,792,817 B2
(45) Date of Patent: Sep. 21, 2004

(54) FIXTURES AND PROCESSES FOR MAGNETIZING MAGNETOELASTIC SHAFTS CIRCUMFERENTIALLY

(75) Inventors: Jeffrey L. Viola, Berkley, MI (US); William T. Moore, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/216,014

(22) Filed: Aug. 9, 2002

(65) Prior Publication Data

US 2004/0025600 A1 Feb. 12, 2004

(51) Int. Cl.[7] .................................................. G01L 3/02

(52) U.S. Cl. .................................................. 73/862.335

(58) Field of Search ........................ 73/892.08, 862.325, 73/862.331, 862.333, 862.335

(56) References Cited

U.S. PATENT DOCUMENTS

| | | | |
|---|---|---|---|
| 3,932,112 A | 1/1976 | Garshelis | |
| 3,939,448 A | 2/1976 | Garshelis | |
| 3,959,751 A | 5/1976 | Garshelis | |
| 3,961,297 A | 6/1976 | Garshelis | |
| 4,012,959 A | 3/1977 | Garshelis | |
| 4,088,946 A | 5/1978 | Charles et al. | |
| 4,188,572 A | 2/1980 | Garshelis | |
| 4,247,601 A | 1/1981 | Wiegand | |
| 4,335,608 A | 6/1982 | Wood et al. | |
| 4,591,788 A | 5/1986 | Mohri et al. | |
| 4,760,745 A | 8/1988 | Garshelis | |
| 4,803,885 A * | 2/1989 | Nonomura et al. | 73/862.333 |
| 4,882,936 A | 11/1989 | Garshelis | |
| 4,896,544 A | 1/1990 | Garshelis | |
| 4,909,917 A * | 3/1990 | Harrison et al. | 204/199 |
| 4,950,988 A | 8/1990 | Garshelis | |
| 4,972,725 A | 11/1990 | Choisnet | |
| 5,052,232 A | 10/1991 | Garshelis | |
| 5,228,349 A | 7/1993 | Gee et al. | |
| 5,247,172 A | 9/1993 | Riemer | |
| 5,255,567 A | 10/1993 | Miyake et al. | |
| 5,293,117 A | 3/1994 | Hwang | |
| 5,307,691 A | 5/1994 | Miyake et al. | |
| 5,351,555 A | 10/1994 | Garshelis | |
| 5,367,257 A | 11/1994 | Garshelis | |
| 5,465,627 A | 11/1995 | Garshelis | |
| 5,504,427 A * | 4/1996 | Cooper et al. | 324/207.17 |
| 5,520,059 A | 5/1996 | Garshelis | |
| 5,589,664 A | 12/1996 | Rode | |
| 5,591,925 A | 1/1997 | Garshelis | |
| 5,646,356 A | 7/1997 | Ling et al. | |
| 5,706,572 A | 1/1998 | Garshelis | |
| 5,708,216 A | 1/1998 | Garshelis | |
| 5,818,134 A * | 10/1998 | Yang et al. | 310/78 |
| 5,887,335 A | 3/1999 | Garshells | |
| 5,889,215 A | 3/1999 | Kilmartin et al. | |
| 6,047,605 A | 4/2000 | Garshelis | |
| 6,128,964 A | 10/2000 | Sobel | |
| 6,145,387 A | 11/2000 | Garshelis | |
| 6,260,423 B1 | 7/2001 | Garshelis | |
| 6,405,841 B1 * | 6/2002 | Zeno | 188/267 |

FOREIGN PATENT DOCUMENTS

| | | |
|---|---|---|
| WO | WO 99/56099 | 4/1999 |

* cited by examiner

*Primary Examiner*—Max Noori
(74) *Attorney, Agent, or Firm*—Brinks Hofer Gilson & Lione

(57) ABSTRACT

An apparatus and method for magnetizing a shaft in a circumferential direction is provided in which electrical current is applied to one or more electrical current conduction tubes and is directed through the tube to at least one coupler having an internal diameter sized so as to circumferentially contact the exterior diameter of a part of the shaft to be magnetized. An electric current pulse is applied to the electrical current conduction tube and radially enters the shaft from the coupler associated with the tube at a substantially 90° degree angle to the axis of the shaft. The current is forced axially along the length of the shaft in the direction of at least a second coupler to magnetize one or more bands along the shaft in a circumferential direction. The current exits the shaft by way of the second coupler and a second electrical conduction tube.

20 Claims, 7 Drawing Sheets

FIXTURES AND PROCESSES FOR MAGNETIZING MAGNETOELASTIC SHAFTS CIRCUMFERENTIALLY

The present invention relates to an apparatus and method for magnetizing a shaft, and more particularly to an apparatus and method for circumferentially magnetizing magnetoelastic torque transducer shafts for providing a measure of torque applied to the shaft.

BACKGROUND

In the control of systems having rotating drive shafts, the amount of torque applied to the drive shaft is an important parameter for control feedback. Therefore, the sensing and measurement of torque in an accurate, reliable and inexpensive manner has been a primary objective. For this purpose, non-contacting magnetoelastic torque transducers have been provided.

Magnetoelastic torque transducers commonly have two features—1) a shaft which is ferromagnetic and magnetostrictive; and 2) a means for detecting or sensing the measure of torque applied to the shaft. Ferromagnetism ensures the existence of magnetic domains within the shaft and magnetostriction allows the orientation of magnetization within each domain to be altered by the stress associated with applied torque.

Torque transducers based on the magnetoelastic response to torque induced mechanical stresses require an internal remanent magnetization of a controlled profile. One type of such transducer comprises a cylindrical shaft having bands of magnetization wherein the magnetization is circumferentially directed. The bands may be either a physically separate component applied to a shaft, e.g. a ring or collar affixed to the shaft to perform the active element function, or one or more magnetoelastic regions integrated into the axial length of the shaft.

Operation of a transducer for the measurement of torque applied to a shaft requires the shaft to be magnetically polarized in a substantially purely circumferential direction. A common method of magnetizing a transducer shaft includes the use of polarizing magnets. A typical arrangement of shaft and polarizing magnets is illustrated in FIGS. 1A and 1B, which show an arrangement of polarizing magnets 90, 92 and shaft 94 for simultaneously creating two magnetically contiguous polarized regions 96, 98. The number of sources of polarizing fields will in general be the same as the number of polarized regions being created. The polarizing magnets 90, 92 are held close to the shaft surface 94 while the shaft 94 is rotated on its axis in either direction in the magnetic field produced externally to the shaft from the dipole-type magnetic source of the polarizing magnets 90, 92. With this technique, it is difficult to control the magnetization profile. In addition, as a practical matter, it is extremely difficult to magnetize a shaft by conventional magnetization methods using polarizing magnets to a depth greater than about 1–2 mm because it is difficult to generate a strong enough magnetic field so far from the magnetic field source, due to the change in reluctance caused by the air gap between the magnet and shaft to be magnetized.

Moreover, the use of external polarizing magnets may result in uneven magnetization where the transducer material deepest within the shaft is insufficiently magnetized, leading to degraded transducer performance, such as reduced short term and long term sensitivity and the creation of "hot-spots"—nonuniformity in the transducer response. This technique is also difficult to optimize, configure and control.

With hollow shafts of large diameter, cooperating internal as well as external polarizing magnets also may be required to obtain a uniform, full-depth polarization of the active region(s), thereby increasing the cost of the apparatus.

An alternative method of magnetizing a shaft includes providing a current in an axial direction near the shaft, directly through the shaft or through a coaxial conductor passed through the central hole of the shaft. In torque transducers of the present invention where the active region is of generally limited axial extent and is to be located at some desirable axial position along the shaft, conventional methods involving the conduction of electrical currents through the entire shaft or through coaxial conductors passing through hollow shafts are unsuitable. Unlike conventional apparatus and methods, the apparatus and method of the present invention magnetizes a length of a shaft of limited axial extent in a substantially purely circumferential direction and throughout the entire depth or thickness of the length of the shaft or width of magnetic zone wanted.

SUMMARY

The scope of the invention is determined solely by the appended claims and their equivalents and is not affected to any degree by the statements within this summary.

The invention provides a method and apparatus for circumferentially magnetizing the active regions of torque transducer shafts for the measurement of torque applied to a shaft, preferably in an automotive steering mechanism. Specifically, the method and apparatus of the present invention address the disadvantages of conventional apparatus and methods of magnetizing torque transducer shafts by providing an apparatus and method that ensures substantially complete magnetization of the active regions of the transducer shaft.

In accordance with one aspect of the present invention, at least three spaced-apart conductor couplers are provided having internal diameters sized so as to circumferentially contact the exterior diameter of the part of the shaft. The couplers substantially surround the outer circumference of the shaft to be magnetized. The contact points of the two outer couplers are coincident with the axial ends of each of circumferential magnetic bands to be provided on the transducer shaft. The center coupler contact point is coincident with the common center of the circumferential magnetic bands to be provided on the shaft. The outer conductor couplers are in at least electrical contact with a two-part inner electrical current conduction tube or conventional conductor and the shaft. The central conductor coupler is in at least electrical contact with an outer electrical current conduction tube or conventional conductor and the shaft.

In one embodiment, at least one high-intensity electric current pulse is applied to the two ends of an outer electrical conduction tube, and directed through the walls of an outer electrical current conduction tube to the central coupler disposed with in the outer electrical current conduction tube. The current radially enters the shaft at a substantially 90° degree angle to the axis of the shaft and is forced axially along the length of the shaft portion comprising the bands of the active region of the transducer in the directions of the outer couplers. The current flow produces a circumferential magnetic field inside the shaft, which leaves the material magnetized after removal of the current. The current exits the shaft through the outer couplers and two inner electrical current conduction tubes. The apparatus of the present invention injects the current in an inherently axisymmetric manner and produces an inherently circumferential remanent magnetization in the transducer shaft. The high-intensity of the current pulse ensures that the transducer material is magnetized throughout its thickness.

In another embodiment, the at least one high-intensity electric current pulse is applied to the ends of the inner conduction tubes and is directed through the inner current conduction tubes to the outer couplers and radially to the shaft. In this embodiment, the current is forced axially along the lengths of the bands of the active region of the transducer shaft in the direction of the center coupler. The current then exits the shaft through the center coupler to the outer current conduction tube.

In yet another embodiment, a decaying alternating current pulse, the first mode of which flows opposite of the apriori applied high-intensity pulse in each band, is then injected to stabilize the magnetization.

DETAILED DESCRIPTION

As discussed above, we have discovered with conventional apparatus and methods for magnetizing torque transducer shafts, it is difficult to control the magnetization profile of the active (magnetized) region of the transducer. Specifically, we have discovered with conventional apparatus and methods for magnetizing torque transducer shafts that portions of the shaft located farthest within the shaft become insufficiently magnetized. As a practical matter, it is extremely difficult to magnetize a shaft by conventional magnetization methods using polarizing magnets to a depth greater than about 1–2 mm because it is difficult to generate a strong enough magnetic field so far from the magnetic field source. We also have found that with conventional apparatus and methods for magnetizing torque transducers that there is non-uniformity of magnetization in the circumferential direction. These shortcomings lead to degradation of transducer performance, including reduced initial and longer-term sensitivity and "hot-spot" inhomogeneities in the transducer response which vary with shaft rotation.

The embodiments of the apparatus and method of the present invention provide uniform magnetization throughout substantially the entire thickness of the transducer shaft and substantially entirely in the circumferential direction with the virtual elimination of rotational variation in the magnetic field about the shaft in the quiescent state as well as under applied torque. We have further found that with the apparatus and method of the present invention there is little or no need for mechanical break-in post conditioning (mechanically exercising or twisting the shaft through applied torque) after initial magnetization.

Figure 1B:
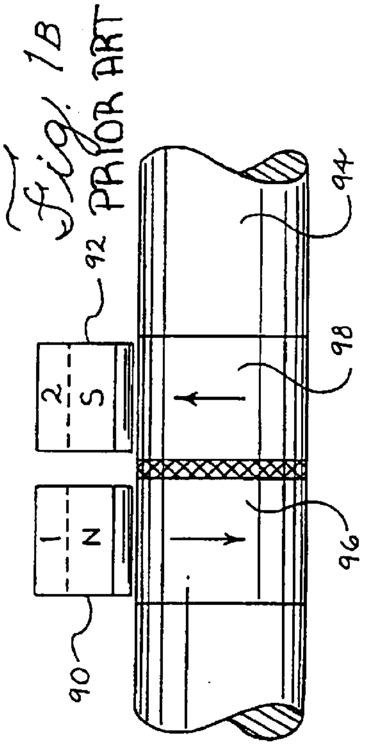
Fig. 1B PRIOR ART
FIG. 1B illustrates a side elevational view of a conventional apparatus and method for magnetizing a shaft using polarizing magnets.
Figure 1A:
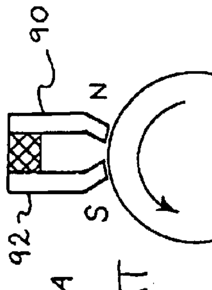
Fig. 1A PRIOR ART
FIG. 1A illustrates a front elevational view of a conventional apparatus and method for magnetizing a shaft using polarizing magnets.
Figure 3:
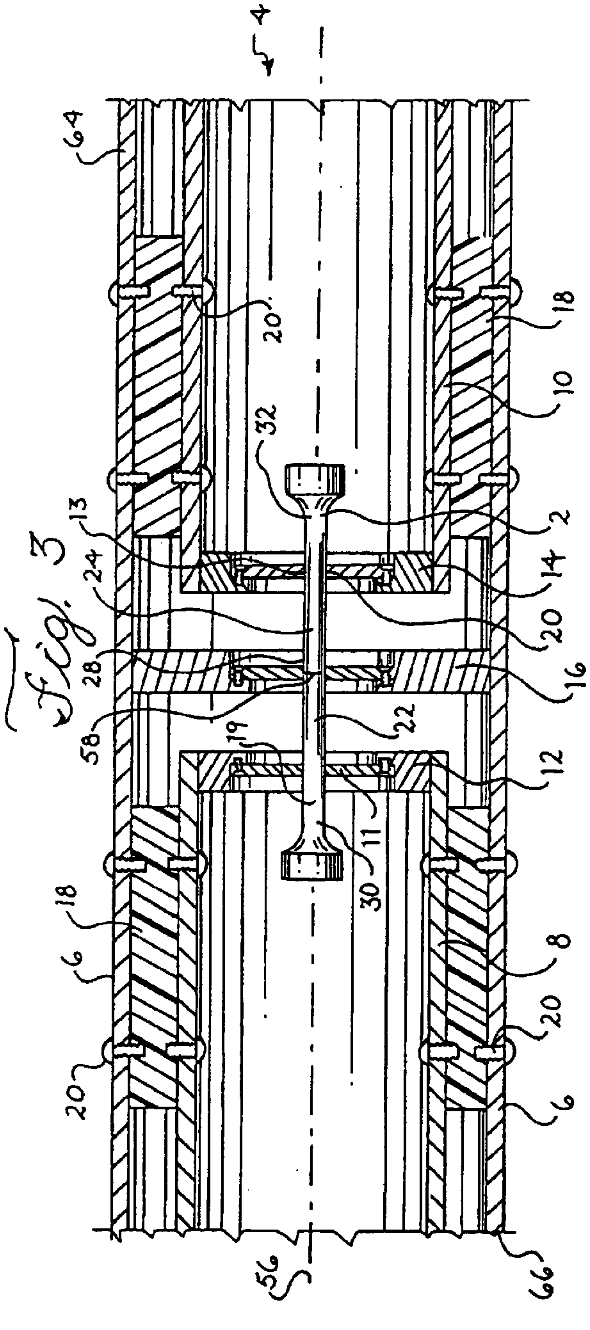
FIG. 3 is a front view of an embodiment the apparatus according to the present invention.
Figure 2:
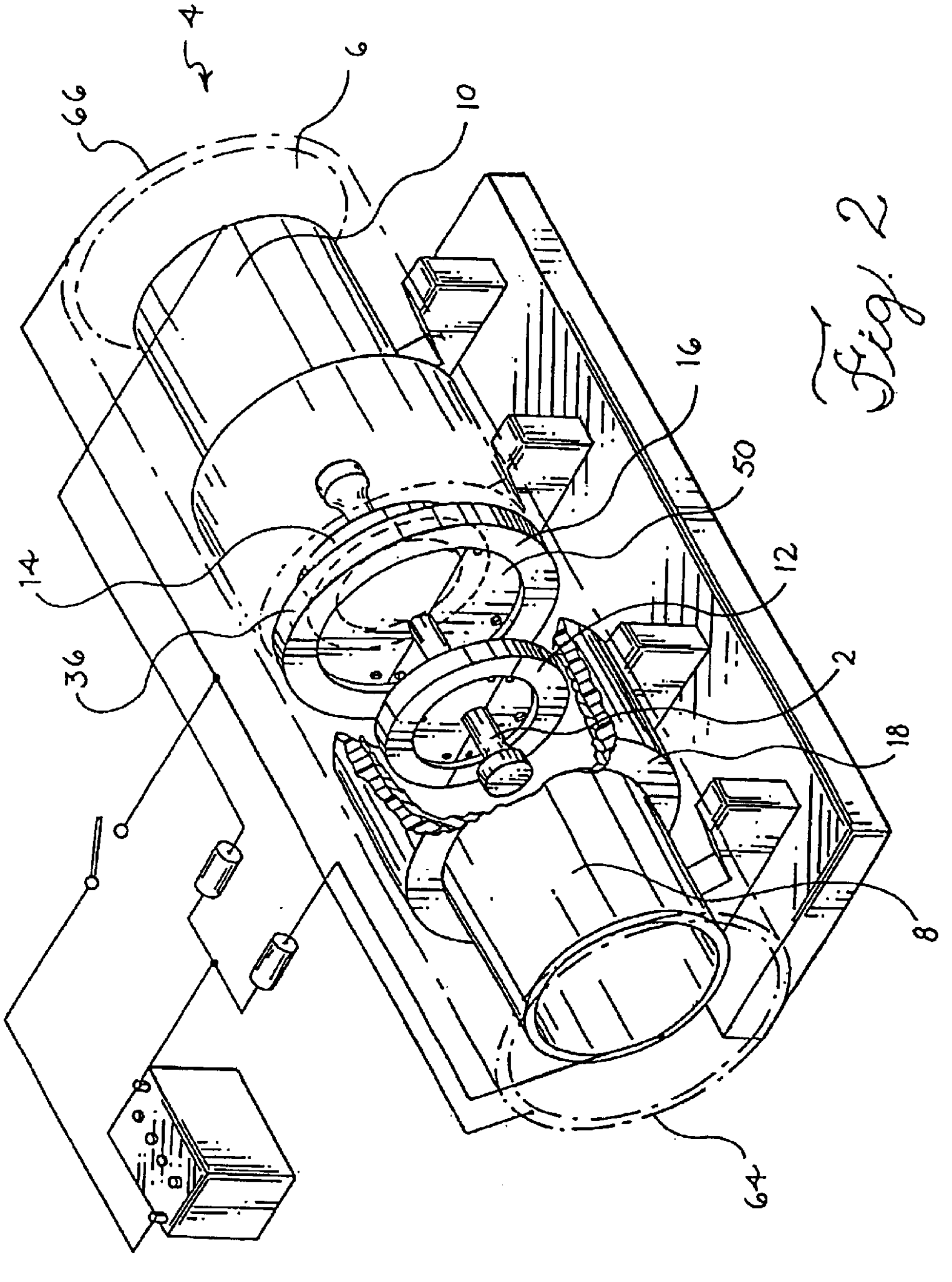
FIG. 2 is a perspective view of an embodiment of the apparatus according to the present invention.
Figure 4:
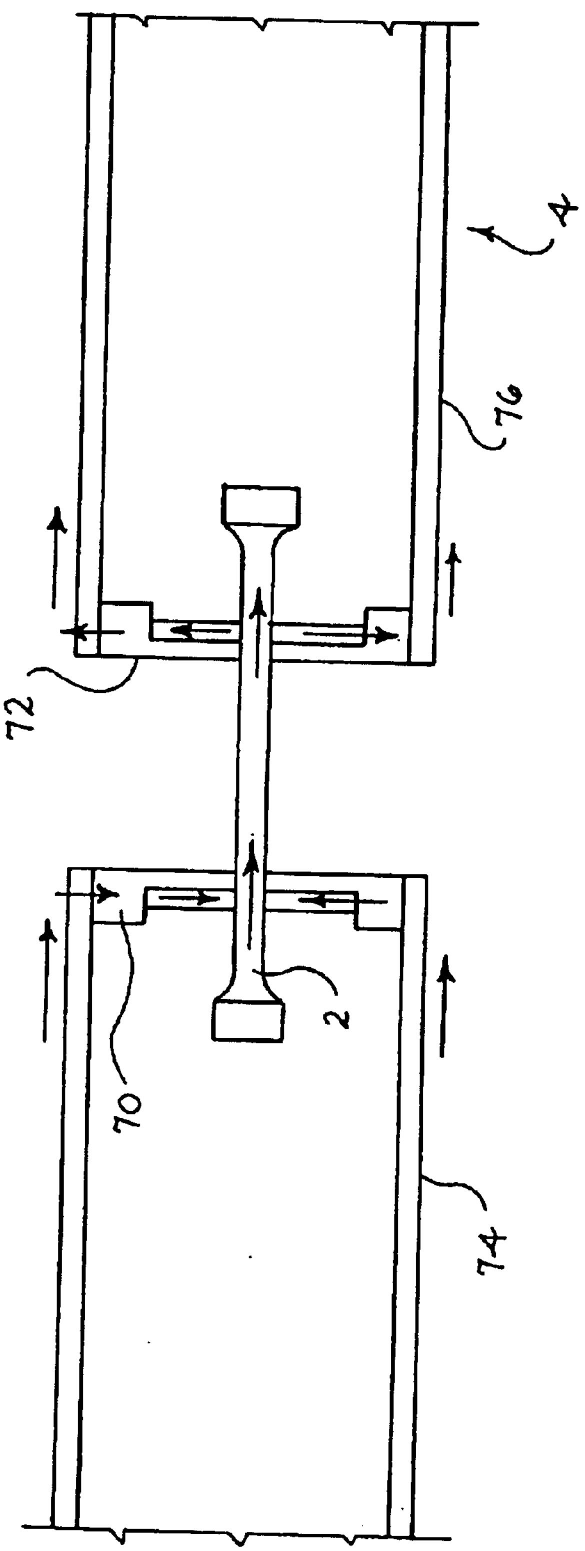
FIG. 4 is a front view of an embodiment the apparatus according to the present invention.

The invention described herein, shown in FIGS. 2–4, is an improvement of the conventional apparatus for magnetizing torque transducers.

Referring first to FIG. 3, an apparatus for magnetizing a shaft 2 according to the present invention is shown generally at 4. Shaft 2, shown at FIGS. 5A–E comprises at least one axial region, comprising at least one, and preferably two, circumferential bands or regions 22 and 24 defining the active or transducer region of the shaft 2. In one embodiment, as shown in FIGS. 2 and 3, where two oppositely polarized circumferential regions are desired, apparatus 4 generally comprises an outer electrical current conduction tube 6, two inner electrical current conduction tubes 8, 10 disposed with outer conduction tube 6, and at least three spaced-apart couplers 12, 14 and 16. Inner conduction tubes 8 and 10 are non-contacting and held apart from the internal walls of outer conduction tube 6 by means of spacers 18.

Couplers 12, 14 and 16 have internal diameters sized to circumferentially contact the exterior diameter of the part of the shaft 2 to be magnetized. Coupler 12 is disposed within inner conduction tube 8 and is in at least electrical, and preferably physical, contact with inner conduction tube 8. Coupler 14 is disposed within inner conduction tube 10 and is in at least electrical, and preferably physical, contact with inner conduction tube 10. Coupler 16 is disposed within outer conduction tube 6 and is in at least electrical, and preferably physical, contact with outer conduction tube 6. Couplers 12, 14 and 16 may be held within their respective conduction tubes by any means known to one skilled in the art including, but not limited to, screws 20, bolts, welding, exterior clamps and the like.

Couplers 12, 14 and 16 substantially surround the outer circumference of shaft 2. As shown in FIG. 3, the internal contact points 11 and 20 of couplers 12 and 14 are coincident with the outer axial ends 13 and 19 of each of circumferential magnetic bands or regions 22 and 24 to be provided on shaft 2. Coupler 16 substantially circumferentially surrounds shaft 2 at the adjacent inner edges, or domain wall 58 of regions 22 and 24. The active region of the shaft 2 is defined by the existence of circumferentially directed remanent magnetization. Region 30 of shaft 2 to the left of circumferential band 22 and region 32 of shaft 2 to the right of circumferential band 24 differ from the active regions only by the absence of significant magnetization.

Figure 6A:
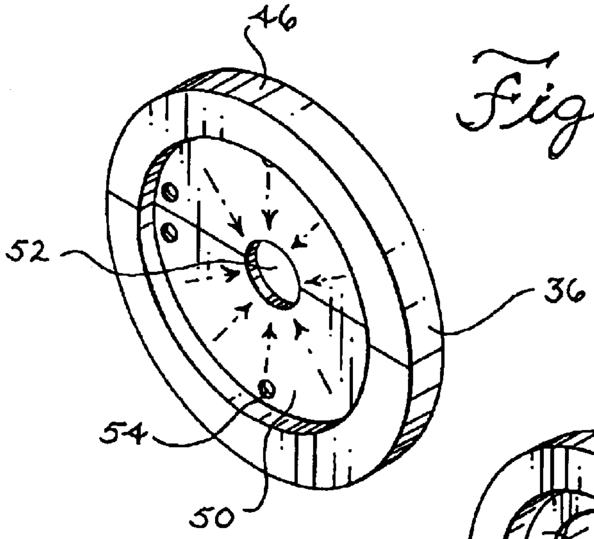
FIG. 6A is a perspective view of an embodiment of a coupler of the apparatus according to the present invention.
Figure 6B:
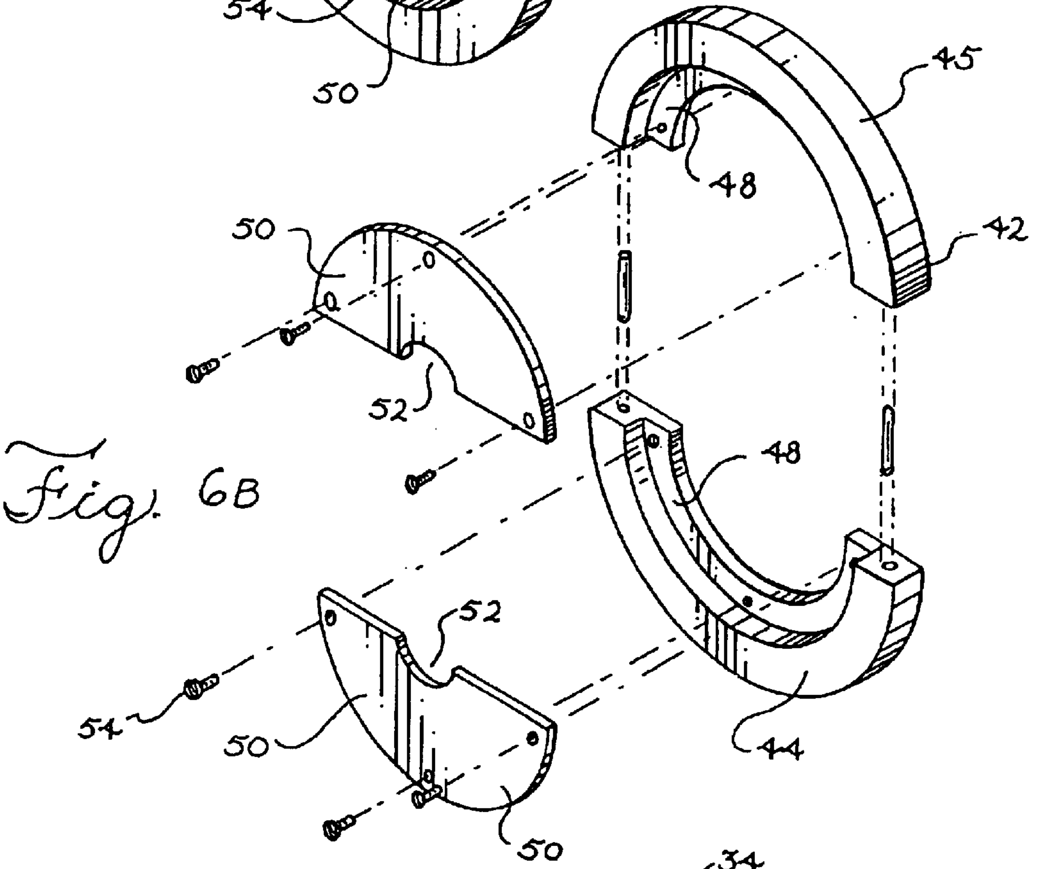
FIG. 6B is an exploded view of an embodiment of a coupler of the apparatus according to the present invention.
Figure 6C:
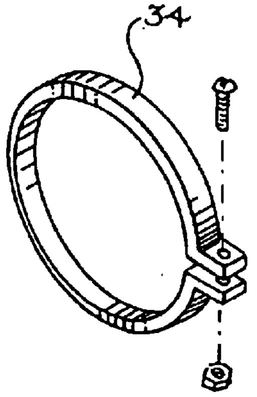
FIG. 6C is a perspective view of an embodiment of a coupler of the apparatus according to the present invention.

In one embodiment shown in FIG. 6*c*, couplers 12, 14, and 16 comprise a stainless steel screw clamp 34. In a preferred embodiment, shown in FIGS. 6A and 6B, couplers 12, 14, and 16 comprise a two-piece outer hub 36 having a first half 44 and a second half 45, an outer surface 46 and a flanged inner surface 48, and an inset plate 50. Inset plate 50 is provided with central opening 52 having an internal diameter sized to circumferentially contact the exterior diameter of the part of the shaft 2 to be magnetized. Inset plate 50 is secured within hub 36 to the flanged inner surface 48 of hub 36 by any means known to one skilled in the art including, but not limited to, screws, bolts, welding and the like. In one embodiment, as shown in FIGS. 6A and 6B, inset plate 50 is secured to the flanged inner surface 48 of hub 36 by screws 54.

Figure 5A:
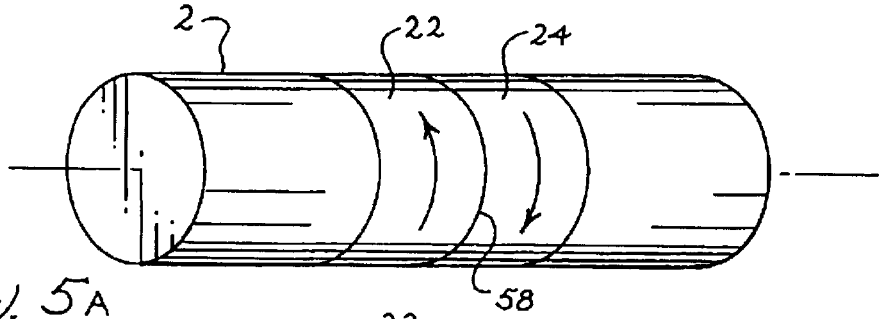
FIG. 5A illustrates a shaft magnetized by the apparatus and method according to the present invention including an active region having adjacent, oppositely polarized, magnetically contiguous circumferential regions formed on a solid shaft.
Figure 5B:
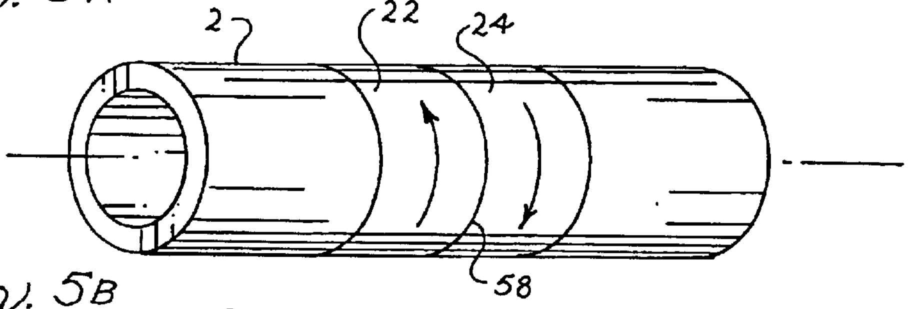
FIG. 5B illustrates a shaft magnetized by the apparatus and method according to the present invention including an active region having adjacent, oppositely polarized, magnetically contiguous circumferential regions formed a hollow shaft
Figure 5C:
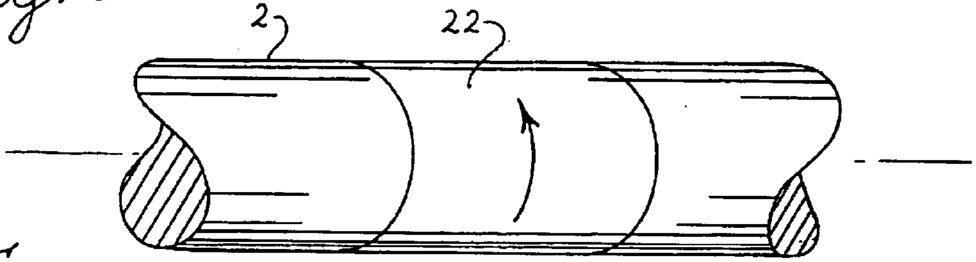
FIG. 5C illustrates a shaft magnetized by the apparatus and method according to the present invention including an active region having a single direction of polarization.
Figure 5D:
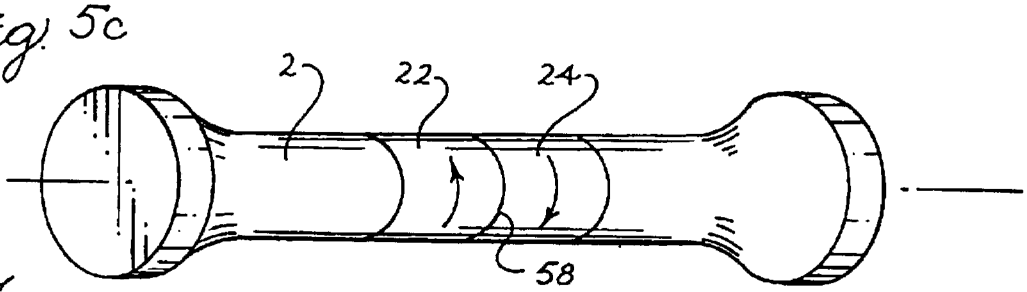
FIG. 5D illustrates a shaft magnetized by the apparatus and method according to the present invention including an active region having adjacent, oppositely polarized, magnetically contiguous circumferential regions formed on a solid shaft having a reduced diameter shaft portion where the active region is formed.

In a preferred embodiment, couplers 12, 14 and 16 enable electric current from an electric current source to be directed through conduction tubes 6, 8 and 10 to shaft 2 axially and uniformly thereby creating uniform circumferential magnetic fields in each of the adjacent active regions 22 and 24, as shown in FIGS. 5A, 5B and 5D. The interior diameter of couplers 12, 14 and 16 will vary according to the diameter of the region of the shaft with which each coupler is associated.

Couplers 12, 14 and 16 can be made of any suitable material that is electrically conductive as long as it is not ferromagnetic. Suitable materials include paramagnetic and diamagnetic materials having electrical conductivity. Suitable diamagnetic materials include copper, bismuth, lead, and mercury, germanium, silver and gold. Suitable paramagnetic materials include aluminum, magnesium, titanium and tungsten. In one preferred embodiment, couplers 12, 14 and 16 are constructed of aluminum. In another preferred embodiment, hub 36 is aluminum and inset plate 50 is copper.

Inner conduction tubes 8, 10 and outer conduction tube 6 can also be made of any suitable material that is electrically conductive, but preferably not ferromagnetic. Suitable materials include paramagnetic and diamagnetic materials having electrical conductivity. Suitable diamagnetic materials include copper, bismuth, lead, and mercury, germanium, silver and gold. Suitable paramagnetic materials include aluminum, magnesium, titanium and tungsten.

Shaft 2 is typically formed of any suitable ferromagnetic, magnetostrictive material. The material must be ferromagnetic to assure the existence of magnetic domains and must be magnetostrictive so that the orientation of the magnetization may be altered by the stresses associated with an applied torque. Suitable materials include commonly available steels including martensitic stainless steels, precipitation hardening stainless steels, alloy steels, tool steels, and nickel maraging steels.

Active regions 22 and 24 of shaft 2 are magnetically polarized in substantially purely circumferential direction to the extent that, at least in the quiescent state (in the absence of torque), the regions have no net magnetization in the direction of the axis 56 and has no net radial magnetization components.

Figure 5E:
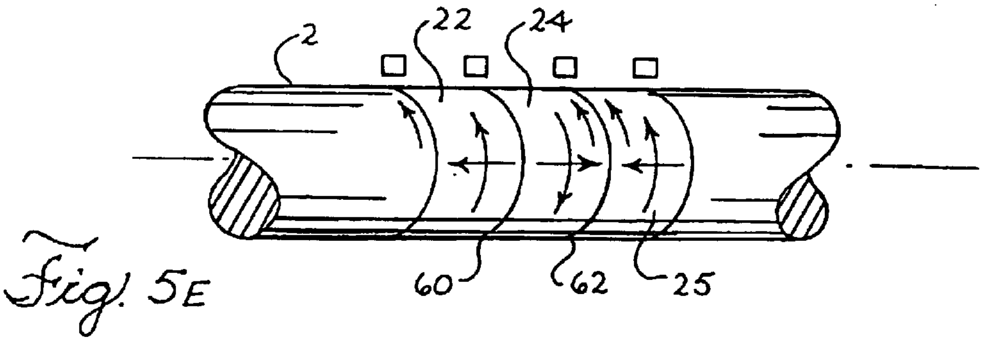
FIG. 5E illustrates a shaft magnetized by the apparatus and method according to the present invention including an active region having three adjacent, oppositely polarized, magnetically contiguous circumferential regions.

The active region of the shaft comprises at least one circumferentially magnetized region of the shaft. FIG. 5A illustrates a solid magnetized shaft circumferentially magnetized in opposite directions with a single transition zone 58. FIG. 5B illustrates a hollow shaft circumferentially magnetized in opposite directions. FIG. 5*c* illustrates the same shaft as in FIG. 5A except that the active region 22 is polarized only in a single direction. FIG. 5E illustrates the same shaft as in FIG. 5A except with three 22, 24, 25 circumferentially polarized regions with two transition zones 60 and 62. FIG. 5E illustrates the same shaft as in FIG. 5A except that the diameter of the shaft in the active region is reduced from that of the main shaft. The width (the axial extent) of regions 22 and 24 generally exceeds the width of the contact point of the couplers. As shown in FIGS. 5A, 5B, 5D and 5E, transition zones 58, 60 and 62 between any two oppositely polarized regions represents a sub-region within which the remanent magnetization undergoes a transition from one circular direction to the other. The minimum width of this region is dependent upon the width of the contact point of the coupler in that region. The width of this region can be made as large as desired by merely increasing the width of the contact point of the coupler at that region.

The axial extent of the active region of the shaft is determined for the most part by practical considerations, such as the region must be long enough to develop a practically useful torque induced magnetic field and appropriately sized so as to be sensed by commercially available, practically useful magnetic vector sensors. Moreover, in specific applications, the space available on the shaft for implementation of the torque sensing function is limited, for example, by virtue of the proximity of non-related magnetizable material. In terms of shaft diameter, a useful range of axial dimensions may be some integral multiple, e.g., four (4) times the diameter for small shafts in the 3 mm range, to one (1) times the diameter for shafts in the 20 mm range, to 0.3 times the diameter for shafts in the 100 mm range. Generally, the length of the active region created by the apparatus and method of the present invention will be between 3 to 100 mm for shafts between 1 and 1000 mm in diameter.

Figure 7:
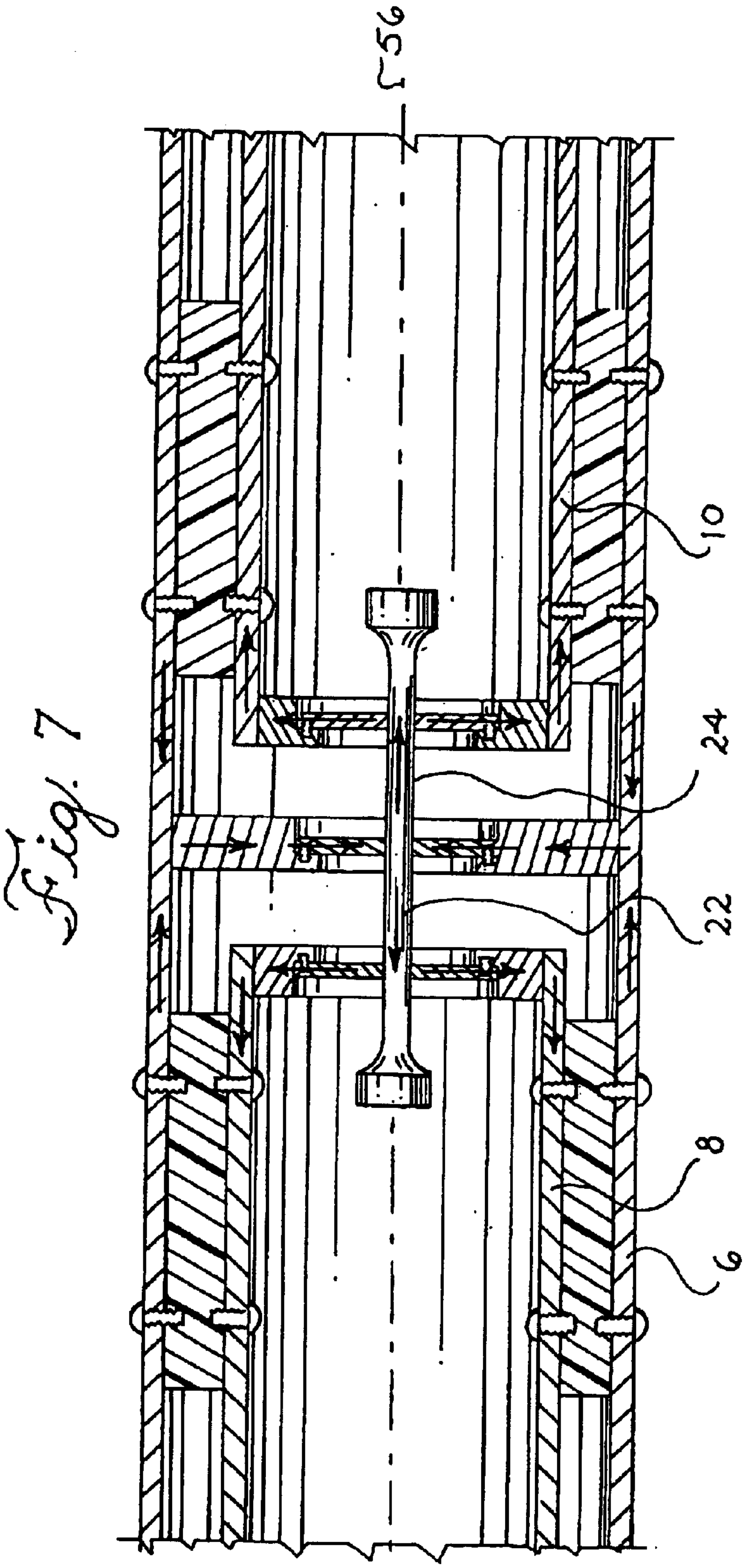
FIG. 7 is a front view of an embodiment the apparatus according to the present invention.

Magnetization of the desired active region of the shaft is obtained by application of an electrical current to the shaft, as shown in FIG. 2. In one embodiment, at least one electric current pulse (either capacitive or inductive) is applied to both ends 64, 66 of outer current conduction tube 6 and directed through current conduction tube 6 to coupler 16 to shaft 2. In this embodiment, the current, indicated by arrows in FIG. 7, enters shaft 2 radially as shown by the arrows in FIG. 6A, from coupler 16 at a substantially 90° angle to the axis 56 of shaft 2. As shown in FIG. 7, electrical current is forced axially along the lengths of bands 22, 24 of the active region of shaft 2 in the directions of couplers 12, 14. The current flow produces a circumferential magnetic field inside shaft 2, which leaves the material magnetized after removal of the current. The current then exits shaft 2 radially through outer couplers 12, 14 and inner current conduction tubes 8, 10 as shown by the arrows in FIG. 7. The apparatus of the present invention injects the current in an inherently axisymmetric manner and produces an inherently circumferential remanent magnetization in the transducer shaft.

Figure 8:
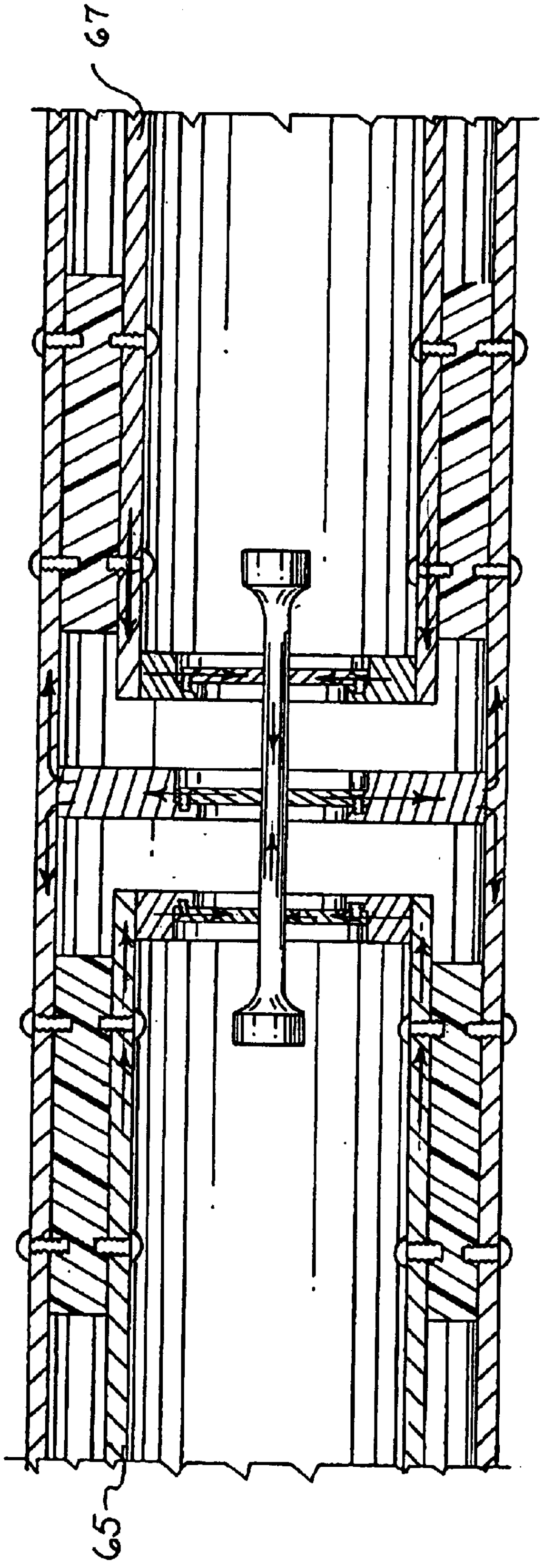
FIG. 8 is a front view of an embodiment the apparatus according to the present invention.

In another embodiment as shown in FIG. 8, the at least one high-intensity electric current pulse is applied to the distal ends 65, 67 of inner current conduction tubes 8, 10 to the outer couplers 12, 14. In this embodiment, the current is forced axially along the lengths of the bands of the active regions of shaft 2 in the direction of coupler 16. The current then exits the shaft 2 through coupler 16 and outer current conduction tube 6.

In the absence of torque, the magnetization in bands 22 and 24 tends to be oriented along a left-handed (LH) direction in one band and long an axially symmetrical right-hand (RH) direction in the other band as shown in by the arrows FIG. 5.

Where magnetization of a shaft in a single circumferential direction is desired as shown in FIG. 5*c*, apparatus 4, shown in FIG. 4, comprises two couplers 70 and 72 in electrical, and preferably physical contact with conduction tubes 74 and 76. Electrical current is applied to the distal end of either conduction tube and is directed radially through the coupler associated with that tube to shaft 2 and is forced axially along the shaft 2 in the direction of the second coupler, and exits radially out of the second coupler to the second conduction tube.

In yet another embodiment of the present invention, two outer conduction tubes, two inner conductions tubes and four couplers are provided for the magnetization of a shaft having three areas of polarization as shown in FIG. 5E.

The current required to thoroughly magnetize the active regions in the circumferential direction is dependent upon the thickness of the shaft and, assuming uniform current density, can be calculated from Ampere's law.

The path integral of B·ds around any (imaginary) closed path is equal to the current enclosed by the path, multiplied by $\mu_0$:

$$\int B \cdot ds = \mu_0 I_{enclosed}$$

The current pulse should be sustained for a sufficient length of time to magnetize the desired transducer regions of shaft 2 the desired depth of penetration. This can be calculated from magnetic field diffusion theory. The fundamental diffusion time constant Tau is related to the relative permeability of the transducer material. The fundamental time constant Tau is defined as:

$$\tau = 1/\alpha_1 = \frac{\mu_0 \sigma d^2}{\pi^2}$$

where σ=conductivity, d=depth and $\mu_0$=permeability. The fundamental time constant, which is the longest time constant of the series, is usually called the diffusion time constant of the system In yet another embodiment, a decaying alternating current pulse of smaller amplitude, the first mode of which flows opposite of the apriori applied high-intensity pulse in each band, is then injected to stabilize the magnetization. Application of the second, smaller pulse "rings" the transducer shaft, causing any magnetic domains that are marginally stable in the circumferential direction to be knocked back into a non-destructive orientation, thereby stabilizing the remanent magnetic field within the shaft.

Once an active region is created by local circumferential polarization or magnetization, the shaft may be properly characterized as a torque transducer. The active region will preferably be comprised of dual polarization.

Of course, it should be understood that a wide range of changes and modifications can be made to the embodiments described above. It is therefore intended that the foregoing description illustrates rather than limits this invention, and that it is the following claims, including all equivalents, that define this invention.

What is claimed is:

1. An apparatus for magnetizing selected portions of a shaft in a substantially circumferential direction comprising:

a first electrical conduction member;

a second electrical conduction member;

a third electrical conduction member adjacent the second electrical conduction member;

at least first and second couplers in at least electrical communication with the second and third electrical conduction members, the couplers having an internal diameter sized to substantially surround and circumferentially contact first and second portions of the shaft;

at least a third coupler in electrical communication with the first electrical conduction member, the third coupler having an internal diameter sized to substantially surround and circumferentially contact a third portion of the shaft between the first and second portions of the shaft, wherein the third coupler is disposed between and spaced apart from the first and second couplers; and means for applying electrical current to at least one of the electrical conduction members.

2. The apparatus of claim 1 wherein the members further comprise nonferromagnetic material.

3. The apparatus of claim 2 wherein the electrically conductive, nonferromagnetic material is selected from the group consisting of diamagnetic and paramagnetic materials.

4. The apparatus of claim 3 wherein the diamagnetic material is selected from the group consisting of copper, bismuth, lead, mercury, germanium, silver and gold.

5. The apparatus of claim 3 wherein the paramagnetic material is selected from the group consisting of aluminum, magnesium, titanium and tungsten.

6. The apparatus of claim 1 wherein the couplers further comprise a generally circular hub having a flanged interior surface and an inset plate disposed within and in electrical contact with the interior surface of the hub.

7. The apparatus of claim 6 wherein the hub further comprises an electrically conductive paramagnetic material and the inset plate further comprises an electrically conductive diamagnetic material.

8. The apparatus of claim 7 wherein the hub further comprises a paramagnetic material selected from the group consisting of aluminum, magnesium, titanium and tungsten and the inset plate further comprises a diamagnetic material selected from the group consisting of copper, bismuth, lead, mercury, germanium, silver and gold.

9. The apparatus of claim 1 wherein the electrical conduction members further comprise cylindrical tubes.

10. An apparatus for magnetizing at least one region of a shaft in a substantially circumferential direction comprising:

a first electrical conduction member, a second electrical conduction member, at least one coupler in electrical communication with the first member, the coupler having an internal diameter sized to substantially surround and circumferentially contact a first portion of the shaft, a second coupler in electrical communication with the second member, the second coupler having an internal diameter sized to substantially surround and circumferentially contact a second portion of the shaft, wherein the second coupler is axially spaced from said first coupler; and means for applying electrical current to one of said members.

11. The apparatus of claim 10 wherein the members further comprise nonferromagnetic material.

12. The apparatus of claim 11 wherein the electrically conductive, nonferromagnetic material is selected from the group consisting of diamagnetic and paramagnetic materials.

13. The apparatus of claim 12 wherein the diamagnetic material is selected from the group consisting of copper, bismuth, lead, mercury, germanium, silver and gold.

14. The apparatus of claim 12 wherein the paramagnetic material is selected from the group consisting of aluminum, magnesium, titanium and tungsten.

15. The apparatus of claim 10 wherein the couplers further comprise a generally circular hub having a flanged interior surface and an inset plate disposed within and in electrical contact with the interior surface of the hub.

16. The apparatus of claim 15 wherein the hub is an electrically conductive paramagnetic material and the inset plate is an electrically conductive diamagnetic material.

17. The apparatus of claim 16 wherein the hub is a paramagnetic material selected from the group consisting of aluminum, magnesium, titanium and tungsten and the inset plate is a diamagnetic material selected from the group consisting of copper, bismuth, lead, mercury, germanium, silver and gold.

18. The apparatus of claim 10 wherein the electrical conduction members further comprise cylindrical tubes.

19. A method of magnetizing at least one selected region of a shaft in substantially circumferential direction comprising:

applying at least one electrical current source to a first current conduction member, directing the electrical current through the current conduction member to an electrical coupler having an interior diameter spaced to circumferentially surround a first outer circumference of the shaft to be magnetized;

directing the current radially from said electrical coupler to the shaft, conducting the electrical current axially through a length of the shaft, directing the current radially from said shaft to at least a second electrical coupler circumferentially surrounding a second outer circumference of the shaft, exiting the current from the at least second coupler through a second current conduction member, and removing the current source from the first conduction member.

20. The method of claim 19 wherein the current source is selected from the group consisting of a single high-intensity capacitive pulse or a single high-intensity inductive pulse.

* * * * *